3,150,078
WHITE OIL MANUFACTURE
Norman E. Lemmon, Hammond, and Fred W. Schuessler, Valparaiso, Ind., assignors to Standard Oil Company, Chicago, Ill., a corporation of Indiana
No Drawing. Filed June 30, 1961, Ser. No. 120,968
9 Claims. (Cl. 208—268)

This invention pertains to improvements in the manufacture of highly refined petroleum oils and in particular to the manufacture of technical and medicinal white petroleum oils.

In the conventional method of preparing white petroleum oil, the distillate oil is treated with from about 2 pounds to about 6 pounds of 104½ acid per gallon of distillate oil in increments of about 2 pound dumps at a temperature of about 100° F. The acid treated oil mass is settled and a 2 phase separation obtained, a bottom heavy sludge layer, and an upper sour oil layer. The sour oil layer is removed, neutralized with caustic and extracted with a lower alkanol to remove the sulfonates present therein. The alcohol extracted oil is then clay treated to obtain a white mineral oil. This method of obtaining white petroleum oil has its limitation in that it is suitable for the treatment of oils of viscosities below about 600 seconds Saybolt at 100° F., since with heavier oils much difficulty is encountered in separating the acid sludge; with oils of high viscosities, sludge separation is often impossible.

It is an object of the present invention to provide an improved method for obtaining white petroleum oils. Another object of the invention is to provide a method for obtaining high viscosity white petroleum oils. Still another object of the invention is to provide a method for obtaining improved yields of white petroleum oil. A further object of the invention is to provide white petroleum oils having a viscosity above about 600 seconds Saybolt at 100° F.

In accordance with the herein described invention, the foregoing objects are attained by treating a particular lubricating oil stock as hereinafter fully defined, in a first acid-treating step or stage with from about 1 pound to about 6 pounds, preferably from about 2 pounds to about 4 pounds of sulfuric acid of at least 95% concentration, preferably 104.5% sulfuric acid (oleum) per gallon of oil treated at a temperature of from about 60° F. to about 100° F. with a contact time of from about 0.5 minute to about 8.0 minutes, preferably from about 1 minute to about 3 minutes, and then at the end of the contact time stopping the reaction by adding to the acid treated mass a sufficient amount of water, or weak sulfuric acid, i.e. less than 50% concentration, at a temperature below about 120° F. to reduce the concentration of unreacted sulfuric acid to less than about 80% preferably to about 50% or less. The water-diluted sulfuric acid treated mass is then settled at about 160–190° F. to permit stratification into two layers, a lower aqueous weak sulfuric acid layer and an upper sour oil layer. The sour oil layer is then extracted with alcohol, preferably 50% isopropyl alcohol to remove the preferentially oil-soluble sulfonic acids. The alcohol-extracted sour oil is then further treated in a second acid-treating stage with from about 0.5 pound to about 4 pounds, preferably from about 0.5 pound to about 2 pounds of 100% to 104.5% sulfuric acid and the acid sludge removed, without prior water-quenching, by conventional methods, i.e. gravity settling or centrifuging. After removal of the acid sludge, the sour oil is again extracted with alcohol, neutralized preferably with sodium hydroxide, steamed to remove alcohol and blown dry. The dried oil is then conventionally percolated through clay to the desired color specification.

If desired, the sour oil from the first acid-treating step can be again acid-treated as in the first step before being acid-treated as in the second acid-treating step. Also, the sulfuric acid is preferably applied to the oil in 0.5 to 1.0 pound increments or "dumps."

Petroleum lubricating oil stocks which are suitable for use in accordance with this invention are those essentially free of polycyclic aromatics, i.e. having less than about 5%, of a polycyclic aromatic fraction averaging 1.2 aromatic rings per molecule, as determined by thermal diffusion analysis or by fractional extraction with wet acetone, and in which the 95–100% fraction, i.e. the last 5% fraction of the lubricating oil stock, has no more than one aromatic ring per average molecule, i.e. $R_A=1$ by the n–dM method of ring analysis. The relative amounts of polycyclic aromatics can be determined by the so-called wet acetone technique wherein the oil stock is extracted with two volumes of acetone containing 10% water, stripping the extract, weighing the stripped extract, and analyzing for $R_A$, that is, the average number of aromatic rings per molecule. The $R_A$ can be determined by the n–dM method, described by Van Nes, K., Van Weston, H. A., Aspects of the Constitution of Mineral Oil, Elsevier Publishing Company, New York (1951). Lubricating oil stocks which are responsive to this technique of sulfuric acid treatment have the following approximate maximum permissible limits: (1) wet acetone soluble —2% with $R_A=1.08$ or (2) thermal diffusion 5% tail cut $R_A=1.0$. Critical inspection tests such as viscosity, viscosity index, or molecular weight do not characterize the suitability of a stock for the preparation of white oils in accordance with this invention. Aromatic ring analysis data, particularly in respect to the average number of aromatic rings per molecule, designated $R_A$, alone is not sufficient. Thus, a solvent extracted MC10 base oil with $R_A=0.16$ responds well to this process, but a blend of MC10 distillate and a white mineral oil, having a combined $R_A$ of also 0.16 is not suitable. Similarly, a solvent refined coastal oil with $R_A=0.80$ can be used, while an MC10 distillate oil with $R_A=0.83$ is not suitable.

Lubricaitng oil stocks solvent extracted by conventional means to give a product having the desired properties given above are especially well suited for the preparation of white oils by the invention. A suitable solvent refined lubricating oil distillate is obtained by the wet phenol extraction of a lubricating oil distillate with a mixture of about 75% phenol and about 25% water. To obtain a suitable stock for the herein described technique, a lubricating oil distillate, for example, a dewaxed mid-continent 10 distillate, is solvent refined in the conventional manner with 2 to 3 volumes of phenol at 140–190°

F. and a first raffinate fraction and a first extract fraction obtained. The first extract fraction is then extracted with a mixture of about 75% phenol and about 25% water at about room temperature, and a second raffinate obtained. The severity of the solvent extraction of the first extract is adjusted to produce a second raffinate containing less than 5% of a polycyclic aromatic fraction averaging 1.2 aromatic rings per molecule as determined by thermal diffusion.

In Table I below are given typical ring data from thermal-diffusion cuts evaluated in terms of the number of aromatic rings per average molecule for an SAE 10 Mid-Continent Base Oil and a phenol solvent extracted SAE 10 Mid-Continent Base Oil.

acid by the conventional method (C) above described, and by the method of the present invention (D). The results obtained are tabulated in Table III, below:

TABLE II

|  | 1 | 2 |
|---|---|---|
| Molecular Weight | 350 | 340 |
| Saybolt Viscosity at 100° F., secs | 105 | 90 |
| Viscosity Index | 68 | 95 |
| $R_A$* | 0.68 | 0.13 |
| Percent Soluble in Wet Acetone | 30 | 2 |
| $R_A$* of Wet Acetone Soluble Material | 1.57 | 1.08 |

*Number of aromatic rings per molecule by $n$-$d$M ring analysis.

TABLE III

*Response of Samples 1 and 2 to Sulfuric Acid Treating Procedures*

| Sample No. | Acid Level, lbs., 104.5 percent acid/gal. | Treating Technique | Treating Yield, percent | Washing Yield, percent | Overall Yield Oil, percent | Mahogany Soap Yield, lbs., 100% Soap/100 gal. | Accumulative Soap Yield, lbs./100 gal. | Percol. Yield to 30+ Saybolt Color, gal./ton |
|---|---|---|---|---|---|---|---|---|
| 1 | 0–3.5 | C | 66.0 | 84.0 | 55.5 | 50 | 50 | 1,600+ |
| 1 | 0–1.5 | D | *NG |  |  |  |  |  |
| 2 | 0–1.5 | C | 88.9 | 97.1 | 86.5 | 16 | 16 | 1,600+ |
|  | 0–1.0 | D | 102.5 | 88.7 | 90.7 | 77 | 77 |  |
|  | 1.0–1.5 | C | 96.0 | 97.4 | 93.6 | 0 | 77 |  |
| 2 | 0–1.5 | Combination |  |  | 85.0 |  | 77 | 1,600+ |

*Technique of present invention considered not suitable when $RSO_3H$ emulsifies with $H_2SO_4$ and forms a 3-phase separation.

TABLE I

*Analyses of Thermal Diffusion Cuts*

| Cut No. | Yield, Percent | MC Distillate, $R_A$ | Solvent Refined MC Distillate, $R_A$ |
|---|---|---|---|
| 0 | 100 | 0.77 | 0.16 |
| 1 | 0–10 | 0.09 | 0.01 |
| 2 | 10–20 | 0.07 | 0.08 |
| 3 | 20–30 | 0.20 A | 0.05 |
| 4 | 30–40 | 0.15 | 0.02 A |
| 5 | 40–50 | 0.48 | 0.10 |
| 6 | 50–60 | 0.68 B | 0.10 |
| 7 | 60–70 | 0.90 | 0.25 |
| 8 | 70–80 | 1.09 | 0.30 B |
| 9 | 80–90 | 1.28 C | 0.40 |
| 10 | 90–100 | 1.44 | 0.50 |

In the above tabulation the MC distillate is divided into three main fractions: fraction A of low aromaticity, fraction B rich in monocyclic aromatics with $R_A$ less than 1.0 and fraction C rich in polycyclic aromatics with $R_A$ greater than 1.0. Fraction A of low aromaticity will not sulfonate to any appreciable extent and hence is suited for white oil production, but yields no sulfonates; fraction B will respond to the invention herein described and give high yields of white oils and oil-soluble sulfonates; and fraction C will sulfonate to give oil-insoluble sludge.

The advantages of the present invention are demonstrated by the following examples which are given by way of illustration.

EXAMPLE I

An MC SAE 5 distillate oil (1) and an MC wet-phenol extracted SAE 5 distillate oil (2) having the inspections tabulated in Table II, below were treated with sulfuric Data in Table III show that when a stock, which is low in polycyclic aromatics (sample 2), is treated by a combination of treating techniques, i.e. the technique of the present invention (D) followed by the conventional acid treating technique (C), a high yield of white oil is obtained; but in addition to this, also a large amount of valuable by-product sulfonate. When the same stock is treated by the conventional technique (C) alone, about the same white oil yield is obtained, the by-product sulfonates, however, are lost. When the stock has 5% or more of wet acetone soluble material (sample 1) the technique of the present invention cannot be used. Acid treating of the raw dewaxed distillate (sample 1) by the conventional method requires more oleum and produces less oil soluble sulfonate than the process of the present invention.

EXAMPLE II

A wet phenol extracted MC–SAE base oil (3) and a blend (4) of 23% MC–SAE 10 distillate oil and 77% white mineral oil having the inspections given in Table IV were treated with sulfuric acid by conventional method and by the method of this invention. The results obtained are tabulated in Table V.

TABLE IV

|  | 3 | 4 |
|---|---|---|
| Molecular weight | 395 | 390 |
| Saybolt Viscosity at 100° F., secs | 174 | 155 |
| Viscosity Index | 98 | 76 |
| $R_A$* | 0.16 | 0.16 |
| Percent Soluble in Wet Acetone |  | 3.5 |
| $R_A$* of wet Acetone Soluble |  | 2.1 |
| $R_A$* of 90–100X Thermal Diffusion Cut | 0.45 |  |

*Number of aromatic rings per molecule—$n$-$d$M ring analysis.

TABLE V

*Response of Samples 3 and 4 to Sulfuric Acid Treating Procedures*

| Sample No. | Acid Level, lbs., 104.5 percent acid/gal. | Treating Technique | Treating Yield, percent | Washing Yield, percent | Overall Yield Oil, percent | Mahogany Soap Yield, lbs., 100% Soap/100 gal. | Accumulative Soap Yield, lbs./100 gal. | Percol. Yield to 30+ Saybolt Color, gal./ton |
|---|---|---|---|---|---|---|---|---|
| 3 | 0–4.0 | C | 77.6 | 89.5 | 69.5 | 30 | 30 | 2,000 |
|   | 0–2.0 | D | 113.0 | 67.5 | 76.3 | 160 | 160 |  |
|   | 2.0–2.5 | C | 95.0 | 98.7 | 93.8 | 0 |  |  |
| 3 | 0–2.5 | Combination |  |  | 71.6 |  | 160 | 1,500 |
|   | 0–2.0 | D | 113.0 | 67.5 | 76.3 | 160 | 160 |  |
|   | 2.0–3.0 | D | 96.2 | 98.4 | 94.7 | 5 | 165 |  |
| 3 | 3.0–3.5 | C | 95.0 | 99.2 | 94.2 | 0 | 165 |  |
|   | 0–3.5 | C |  |  | 68.1 |  | 165 | 4,000 |
| 4 | 0–2.0 | D | No Good | (3-phase separation) |  |  |  |  |

Data in the above Table V show that the combination method of acid treating in accordance with the present invention is superior to the conventional method by giving higher percolation and sulfonate yields. The oil 4 did not respond to the technique of the present invention, even though the number of aromatic rings per molecule was the same as for the solvent refined stock. The composition of this blend was such that it contained 3.5% of wet acetone soluble material, which analyzed to be 2.1 aromatic rings per molecule. The solvent refined stock 3 contained the same number of aromatic rings per molecule, but the most aromatic cut obtained by thermal diffusion contained only 0.45 aromatic rings per molecule.

EXAMPLE III

An MC SAE 30 distillate oil was solvent extracted with wet phenol and a raffinate 5 having the specifications given in Table VI obtained.:

TABLE VI

| | |
|---|---|
| Molecular weight | 5 |
| Saybolt viscosity at 100° F., secs. | 476 |
| Viscosity index | 90 |
| RA [1] | 0.35 |
| RA [1] of 95–100% thermal diffusion cut | 0.70 |

[1] Number of aromatic rings per molecule—n-dM ring analysis.

This raffinate was sulfuric acid treated by the conventional method (C), by the method (D) as hereinabove described and by the combination of methods (C) and (D) in accordance with the present invention. The data obtained are given in Table VII.

The conventional technique (on high M.W. oils) has inherent liabilities related to sludge settling and pumping. In the case of the combination treating technique of the present invention, these difficulties do not occur during the first and second acid application, because no sludge is formed. Subsequent acid applications, by the conventional technique, do form viscous sludges, but the volume is small and the sludge settles very well. When such high viscosity oils are to be treated to USP quality, it is necessary to follow the technique of the present invention for satisfactory percolation yields to color.

EXAMPLE IV

The data of this example demonstrate further advantages of the present invention. A wet-phenol solvent extracted MC SAE 40 distillate (6)) and a wet-phenol solvent extracted bright stock (7) having inspections given in Table VIII were sulfuric acid-treated in accordance with the present invention to obtain white oils of high viscosity as shown by the data in Table IX.

TABLE VIII

| | 6 | 7 |
|---|---|---|
| Molecular Weight | 560 | 670 |
| Saybolt Viscosity at 100° F | 1,000 | 2,516 |
| Viscosity Index | 84 | 96 |
| $R_A$* | 0.48 | 0.70 |
| $R_A$* of 95–100% Thermal Diffusion Cut | 0.8 |  |
| Percent Soluble in Wet Acetone | 2.0 |  |
| $R_A$* of Wet Acetone Soluble Fraction | 0.9 |  |

* Number of aromatic rings per molecule—n-dM ring analysis.

TABLE VII

*Response of Sample 5 to Sulfuric Acid Treating Procedures*

| Sample No. | Acid Level, lbs., 104.5 percent acid/gal. | Treating Technique | Treating Yield, percent | Washing Yield, percent | Overall Yield Oil, percent | Mahogany Soap Yield, lbs., 100% Soap/100 gal. | Accumulative Soap Yield, lbs./100 gal. | Perco. Yield to 30+ Color OK-Acid Test, gal./ton |
|---|---|---|---|---|---|---|---|---|
| 5 | 0–1.5 | C | 81.0 | 80.0 | 65.0 | 56.9 | 56.9 |  |
|   | 1.5–4.0 | C | 91.0 | 94.6 | 86.1 | 13.3 | 70.2 |  |
|   | 0–4.0 | C |  |  | 56.0 |  | 70.2 | 2,000 |
|   | 0–2.0 | D | 108.0 | 66.0 | 71.8 | 170.5 | 222.5 |  |
|   | 2.0–3.5 | D | 101.1 | 88.4 | 89.4 | 52.0 | 222.5 |  |
|   | 3.5–4.0 | C | 94.4 |  | 94.4 | 0 | 222.5 |  |
| 5 | 4.0–4.5 | C | 97.3 | 93.0 | 90.5 | 0 | 222.5 |  |
|   | 0–4.5 | Combination |  |  | 54.7 |  | 222.5 | 1,500 |

These oils could not be economically treated by the conventional sulfuric acid treating methods since no separation of acid sludge and sulfuric acid could be affected in the absence of a diluent because of the high viscosity. The application of a two pound dump of 104.5% sulfuric acid per gallon on such stocks gave no phase separation even when settled for 16 hours at 130° F. or centrifuged at 130° F.

Treatment of such stocks by the method of the present invention gave results given in Table IX.

TABLE IX

*Response of Samples 6 and 7 to Sulfuric Acid Treating Procedures*

| Sample No. | Acid Level, lbs., 104.5 percent acid/gal. | Treating Technique | Treating Yield, percent | Washing Yield, percent | Overall Yield Oil, percent | Mahogany Soap Yield, lbs., 100% Soap/100 gal. | Accumulative Soap Yield, lbs./100 gal. | Perco. Yield to 30+ Color OK-Acid Test, gal./ton |
|---|---|---|---|---|---|---|---|---|
| 6 | 0–2.0 | D | 109.2 | 66.2 | 72.2 | 197 | | |
|   | 2.0–4.0 | D | 106.5 | 77.4 | 82.4 | 85 | 282 | |
|   | 4.0–4.5 | C | 92.5 | 89.5 | 82.8 | 0 | | |
|   | 0–4.5 | Combination. | | | 49.4 | | 282 | 2,000 |
| 7 | 0–2.0 | D | 107.2 | 44.0 | 47.2 | 204 | | |
|   | 2.0–3.0 | D | 103.9 | 76.6 | 79.6 | 50 | 254 | |
|   | 3.0–4.0 | D | 100.5 | 87.4 | 87.8 | 18 | 272 | |
|   | 4.0–4.5 | C | 93.0 | | 93.0 | 0 | 272 | |
|   | 4.5–5.0 | C | 100.0 | 97.3 | 97.3 | 0 | 272 | |
|   | 0–5.0 | Combination. | | | 30.0 | | 272 | 200 |

The percolated white oils made from 6 and 7 had viscosities at 100° F. of 645 and 1300 seconds respectively and met all U.S.P. standards of medicinal white oil. Such high viscosity white oils are novel in the art.

In the foregoing examples, the oils were first treated at least once with fuming sulfuric acid in 0.5 to 2.0 pound dumps of acid at a temperature of about 100° F. at a short time of contact, about 2 minutes, then quickly quenched with sufficient water to reduce the sulfuric acid concentration to about 50%, and then separating the sour oil layer from the weak sulfuric acid layer. The sour oil was then extracted with 50 volumes of 50% isopropyl alcohol per 100 volumes of sour oil to remove and recover the sulfonic acids in the sour oil and the alcohol-extracted sour oil then treated at least once with an 0.5 pound dump of fuming sulfuric acid by the conventional method. After each dump of acid, by either method the separated sour oil was extracted with isopropyl alcohol to recover the sulfonic acids therein. After the final alcohol the sour oil was neutralized and filtered through a suitable clay, such as Attapulgus clay to the desired technical grade white oil quality or to U.S.P. white oil quality.

The lower viscosity white oils obtained by the process of the present invention can be employed as conventional white oils, i.e. technical white oils and U.S.P. white oils. The white oils obtained by treating solvent-extracted SAE 40 distillates or bright stocks can be used as plasticizers for various types of plastics such as for example polystyrenes.

Although the present invention has been described with reference to specific preferred embodiments thereof, the invention is not to be considered limited thereto, but includes within its scope such modifications and variations as come within the spirit of the appended claims.

We claim:

1. The method of preparing white petroleum oil from petroleum lubricating oil base comprising treating an aromatics-containing petroleum lubricating oil base containing less than five percent of a polycyclic aromatic fraction averaging 1.2 aromatic rings per molecule and having no more than one aromatic ring per average molecule in the 90% to 100% fraction of said aromatics-containing petroleum lubricating oil base, with from about 1 pound to about 6 pounds of concentrated sulfuric acid of at least 95% concentration, per gallon of oil treated at a temperature of from about 60° F. to about 120° F. at a contact time of from about 0.25 minute to about 8 minutes, diluting the reaction mass to reduce the concentration of the unreacted sulfuric acid to below about 80%, settling the water-diluted sulfonation mass at a temperature of about 160° F.-190° F. for a time sufficient to obtain a lower weak sulfuric acid layer and an upper sour oil layer containing soil-soluble sulfonic acids, separating and removing the lower weak sulfuric acid layer, extracting the sour oil layer with an alkanol to remove the preferentially oil-soluble sulfonic acids, treating the extracted sour oil with fuming sulfuric acid, to obtain an upper sour oil layer and a lower acid sludge layer, removing the acid sludge, washing the sour oil with an alkanol to extract therefrom sulfonic acids, neutralizing the extracted sour oil and clay filtering.

2. The method of claim 1 in which the petroleum lubricating oil base is a solvent extracted petroleum lubricating oil base.

3. The method of claim 2 in which the solvent is wet phenol.

4. The method of claim 2 in which the solvent is wet acetone.

5. The method of claim 1 in which the alkanol is isopropanol.

6. The method of manufacturing white petroleum oil from petroleum lubricating oil base comprising treating an aromatics-containing petroleum lubricating oil base containing less than five percent polycyclic aromatic compounds averaging 1.2 aromatic rings per molecule and having no more than one aromatic ring per average molecule in the 90% to 100% fraction of said aromatics-containing petroleum lubricating oil base, with from about 1 pound to about 6 pounds of concentrated sulfuric acid of at least 95% concentration, per gallon of oil treated at a temperature of from about 60° F. to about 120° F. at a contact time of from about 0.25 minutes to about 8 minutes, adding sufficient water at a temperature below about 120° F. to reduce the concentration of the unreacted sulfuric acid to below about 80%, settling the water-diluted sulfonation mass at a temperature of about 160° F.-190° F. for a time sufficient to obtain a lower weak sulfuric acid layer and an upper sour oil layer containing oil-soluble sulfonic acids, separating and removing said weak sulfuric acid layer extracting the sour oil layer with 50–60% isopropanol to extract therefrom the preferentially oil-soluble sulfonic acids, treating the extracted sour oil with about from 0.5 to about 4 pounds of fuming sulfuric acid per gallon of sour oil to obtain a sour oil layer and an acid sludge layer separating the acid sludge layer, extracting the sour oil layer with about 50–60% isopropanol, neutralizing the extracted sour oil with sodium hydroxide, steaming the neutralized extracted sour oil to remove therefrom alcohol, blowing the steamed oil dry and clay treating the dry neutralized oil.

7. The method of claim 6 in which the petroleum lubricating oil base is a solvent extracted petroleum lubricating oil base.

8. The method of claim 7 in which the solvent is wet phenol.

9. The method of claim 6 in which the petroleum lubricating oil base is an SAE 40 base oil.

References Cited in the file of this patent

UNITED STATES PATENTS

| | | |
|---|---|---|
| 1,824,615 | Myers | Mar. 2, 1929 |
| 2,321,290 | Giraitis | June 8, 1943 |
| 2,515,197 | Cohen | July 18, 1950 |
| 2,882,220 | Mikeska | Apr. 14, 1959 |
| 2,900,333 | Collins et al. | Aug. 18, 1959 |

FOREIGN PATENTS

| | | |
|---|---|---|
| 797,750 | Great Britain | July 9, 1958 |

UNITED STATES PATENT OFFICE
CERTIFICATE OF CORRECTION

Patent No. 3,150,078                  September 22, 1964

Norman E. Lemmon et al.

It is hereby certified that error appears in the above numbered patent requiring correction and that the said Letters Patent should read as corrected below.

Column 4, TABLE IV, first column, line 7 thereof, for "90-100X" read -- 90-100% --; column 5, TABLE VI, line 1 thereof, for "Molecular weight--------------5" read Molecular weight-----------------$\frac{5}{470}$ Signed and sealed this 18th day of May 1965.

(SEAL)
Attest:

ERNEST W. SWIDER                        EDWARD J. BRENNER
Attesting Officer                         Commissioner of Patents